(12) United States Patent
Tsai et al.

(10) Patent No.: US 8,217,621 B2
(45) Date of Patent: Jul. 10, 2012

(54) FREQUENCY MODULATION TYPE WIRELESS POWER SUPPLY AND CHARGER SYSTEM

(75) Inventors: Ming-Chiu Tsai, Taipei (TW); Chi-Che Chan, Taipei (TW)

(73) Assignee: Fu Da Tong Technology Co., Ltd., Taipei County (TW)

( * ) Notice: Subject to any disclaimer, the term of this patent is extended or adjusted under 35 U.S.C. 154(b) by 296 days.

(21) Appl. No.: 12/773,229

(22) Filed: May 4, 2010

(65) Prior Publication Data
US 2011/0199046 A1    Aug. 18, 2011

(30) Foreign Application Priority Data

Feb. 12, 2010   (TW) ............................... 99203171 U (51) Int. Cl.
*H02J 7/00* (2006.01)
*H02J 7/04* (2006.01)
*H04B 5/00* (2006.01)
*G01V 3/00* (2006.01)

(52) U.S. Cl. ....... 320/108; 320/109; 320/139; 455/41.1; 455/41.3; 455/269; 455/270; 455/343.1; 340/854.3; 340/870.3

(58) Field of Classification Search .................. 320/108, 320/109
See application file for complete search history.

(56) References Cited

U.S. PATENT DOCUMENTS

| 7,180,248 B2 * | 2/2007 | Kuennen et al. ............... 315/224 |
| 2007/0279002 A1 * | 12/2007 | Partovi ........................ 320/115 |

* cited by examiner

*Primary Examiner* — Drew A Dunn
*Assistant Examiner* — Nathaniel Pelton
(74) *Attorney, Agent, or Firm* — Muncy, Geissler, Olds & Lowe, PLLC (57) ABSTRACT

A frequency modulation type wireless power supply and charger system includes a power supply base unit consisting of a first microprocessor, a power circuit, a power switch driver circuit, a first resonant circuit, a first coil, a detection module and a power input interface, and a wireless power supply and charge receiver unit consisting of a secondary coil, a second resonant circuit, a rectifier filter circuit, a detection and protection module, a second microprocessor, a temperature sensor, a charging module and a power output interface and adapted for receiving electrical power from the power supply base unit wirelessly for charging an external electronic device.

8 Claims, 6 Drawing Sheets

FREQUENCY MODULATION TYPE WIRELESS POWER SUPPLY AND CHARGER SYSTEM

This application claims the priority benefit of Taiwan patent application number 099203171 file on Feb. 12, 2010.

BACKGROUND OF THE INVENTION

1. Field of the Invention

The present invention relates to wireless electrical power supplying techniques and more particularly, to a frequency modulation type wireless power supply and charger system, which comprises a power supply base unit connected to an external power source, and a wireless power supply and charge receiver unit adapted for receiving electrical power from said power supply base unit wirelessly for charging an external electronic device being connected thereto, wherein the detection and protection module of the wireless power supply and charge receiver unit detects the electrical power provided by the power supply base unit and sends a feedback signal to the power supply base unit for causing the power supply base unit to regulate its output power, thereby saving power consumption and minimizing the load.

2. Description of the Related Art

With the coming of digital era, many digitalized electronic products, such as digital camera, cellular telephone, music player (MP3) and etc., have been continuously developed and have appeared on the market. These modern digital electronic products commonly have light, thin, short and small characteristics. For high mobility, power supply is an important factor. A mobile digital electronic product generally uses a rechargeable battery to provide the necessary working voltage. When power low, the rechargeable battery can be recharged. For charging the rechargeable battery of a digital electronic product, a battery charger shall be used. However, it is not economic to purchase one respective battery charger when buying a new mobile electronic product. When many different battery chargers for different mobile electronic products are prepared, a big storage space is necessary for keeping these battery chargers in place. Further, it takes much time to find and pick up the correct battery charger from the storage group of battery chargers.

Further, when using a battery charger to charge the rechargeable battery of a mobile electronic product, it is necessary to connect the connection interface of the battery charger to an electric outlet and then insert the power output plug of the battery charger to the power jack of the mobile electronic product. After charging, the user needs to remove the battery charger from the mobile electronic product. When wishing to charge the rechargeable battery of a mobile electronic product, the user must carry the mobile electronic product to a place where there is an electric outlet. When one goes out to a place there is no any electric outlet available, the user will be unable to charge the rechargeable battery of his(her) mobile electronic product.

To eliminate the aforesaid problems, electromagnetic induction type power transmission products are developed. For the advantage of noncontact transmission of power supply, these electromagnetic induction type power transmission products bring convenience to people. However, these conventional electromagnetic induction type power transmission products still have drawbacks as follows:

1. The power transmitting side of these conventional electromagnetic induction type power transmission products is formed of a coil and a resonant circuit and does not allow adjustment of the output power when electrically connected. When the power requirement of the electronic product at the receiving side is changed, the output power of the power transmitting side cannot be regulated to match the demand, causing power insufficiency or power waste.

2. The resonant capacitor and the receiving coil at the receiving side are connected in parallel. Thus, the resonant capacitor and the receiving coil keep consuming electrical power when receives no load, wasting the energy.

3. The coils are prepared from a single-core enameled wire. During high frequency application, the coils produce much heat, lowering the transmission efficiency and performance.

4. These conventional electromagnetic induction type power transmission products do not provide any safety circuit means at the receiving side, and the electronic device under charging may be damaged in case of a short circuit or overcurrent.

Therefore, it is desirable to provide a noncontact power transmission measure that eliminates the aforesaid problems.

SUMMARY OF THE INVENTION

The present invention has been accomplished under the circumstances in view. It is one object of the present invention to provide a frequency modulation type wireless power supply and charger system, which minimizes power transmission loss and the load of the internal components, thereby saving power consumption.

To achieve this and other objects of the present invention, a frequency modulation type wireless power supply and charger system comprises a power supply base unit, and a wireless power supply and charge receiver unit adapted for receiving electrical power from the power supply base unit wirelessly for charging an external electronic device being connected thereto. The power supply base unit consists of a first microprocessor, a power circuit, a power switch driver circuit, a first resonant circuit, a first coil, a detection module and a power input interface. The wireless power supply and charge receiver unit consists of a secondary coil, a second resonant circuit, a rectifier filter circuit, a detection and protection module, a second microprocessor, a temperature sensor, a charging module and a power output interface. The detection and protection module of the wireless power supply and charge receiver unit detects the supply of the electrical power received from the power supply base unit so that the second microprocessor sends a feedback signal to the power supply base unit through the signal generator circuit and the second resonant circuit for enabling the power supply base unit to control the power switch driver circuit to regulate its output power automatically, thereby minimizing power transmission loss and the load of the internal components of the wireless power supply and charge receiver unit.

Further, the power switch driver circuit of the power supply base unit comprises a full/half-bridge driver circuit, a first MOSFET (metal oxide semiconductor field effect transistor) array and a second MOSFET (metal oxide semiconductor field effect transistor) array. The first MOSFET (metal oxide semiconductor field effect transistor) array and the second MOSFET (metal oxide semiconductor field effect transistor) array are connected in parallel to the full/half-bridge driver circuit. Thus, the full/half-bridge driver circuit can switch the output power rapidly under a continuous operation status. When does no work, the full/half-bridge driver circuit can cut off the first MOSFET (metal oxide semiconductor field effect transistor) array and the second MOSFET (metal oxide semiconductor field effect transistor) array, avoiding power leakage and minimizing static power consumption.

Further, the first coil and the second coil are respectively made by: twisting multiple enameled wires together and bonding the twisted enameled wires with an insulative adhesive to form a wire material and then using a mold to wind the wire material into a flat, rectangular configuration. Thus, the first coil and the second coil have low impedance and high inductance characteristics when used for high frequency application, reducing the amount of heat and improving the transmission efficiency and performance.

Further, the resonant capacitor of the second resonant circuit of the wireless power supply and charge receiver unit is connected in series to the second coil, assuring zero power consumption during zero load resonance and high power obtaining during a high load.

Further, the circuit-breaker protection circuit of the detection and protection module of the wireless power supply and charge receiver unit is electrically connected between the voltage regulator circuit and the rectifier filter circuit. The current detection and protection circuit of the detection and protection module is electrically connected to the voltage regulator circuit and the buck-boost converter. Further, the current detection and protection circuit uses a reset fuse for overcurrent protection. In case of an overcurrent, electrical power is automatically cut off from the circuit-breaker protection circuit, and the reset fuse of the current detection and protection circuit opens the circuit for protection. Therefore the invention achieves a double safety protection, avoiding a short circuit or any possible damage.

DETAILED DESCRIPTION OF THE PREFERRED EMBODIMENT

Figure 1:
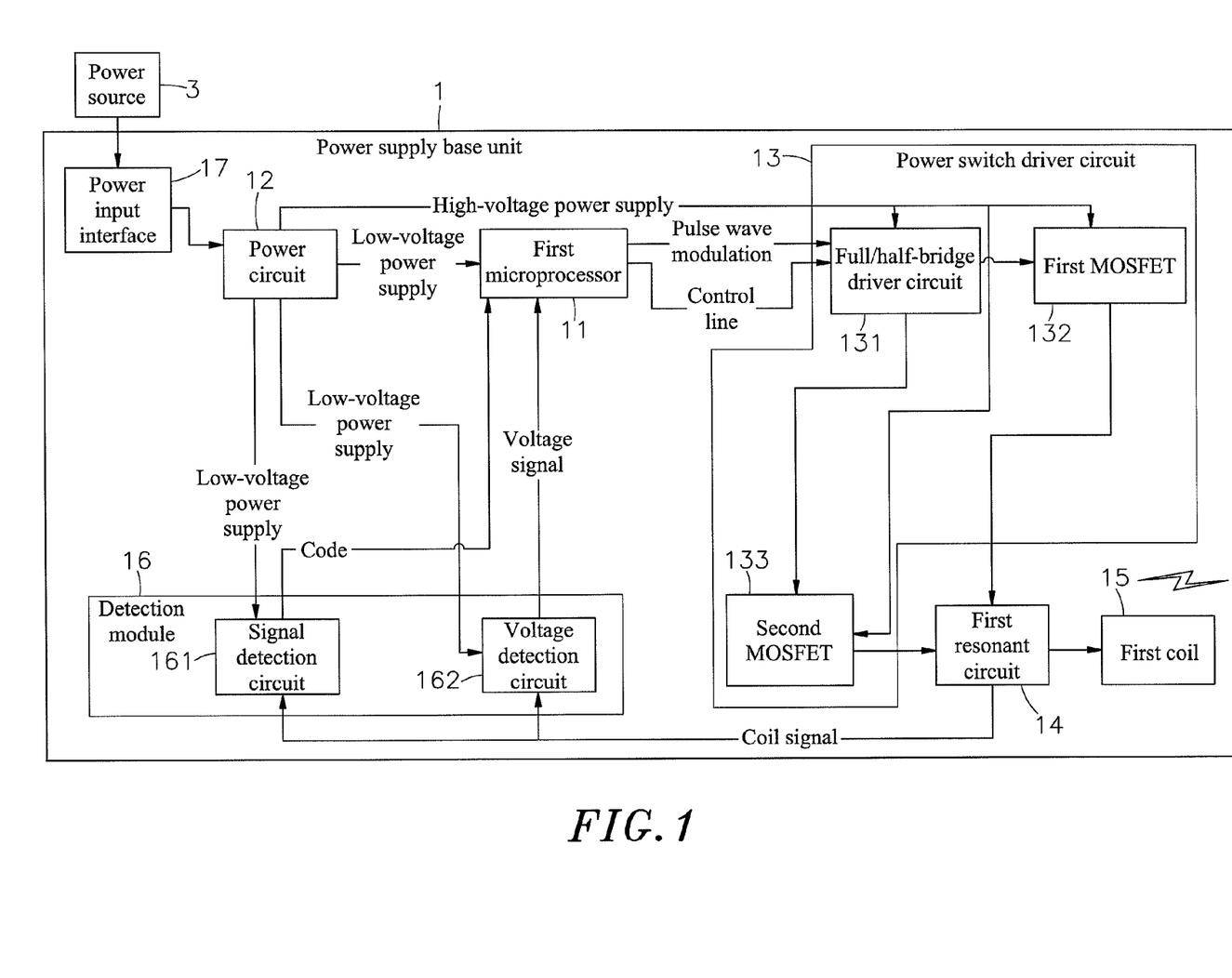
FIG. 1 is a circuit block diagram of a power supply base unit for a frequency modulation type wireless power supply and charger system in accordance with the present invention.
Figure 2:
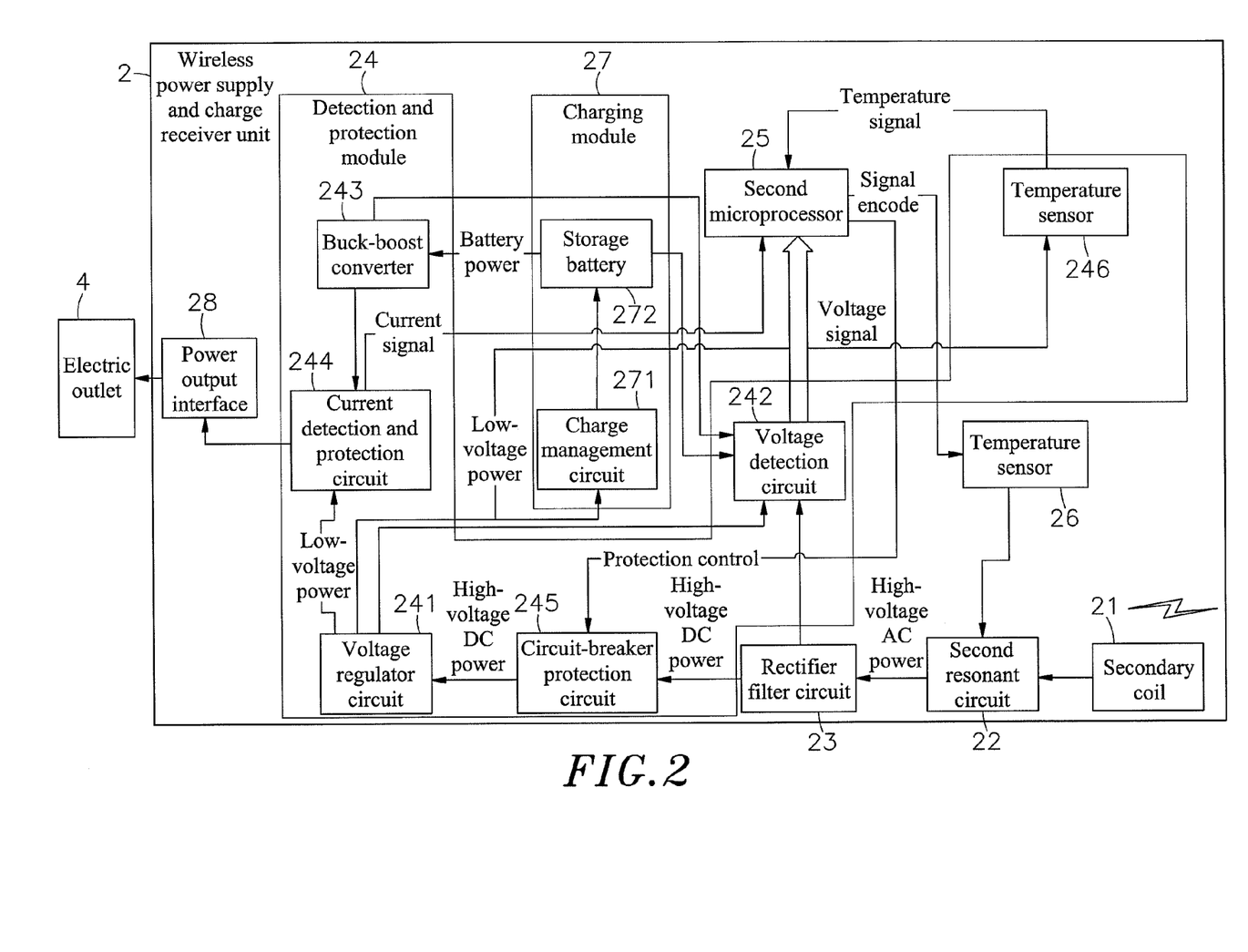
FIG. 2 is a circuit block diagram of a wireless power supply and charge receiver unit for the frequency modulation type wireless power supply and charger system in accordance with the present invention.

Referring to FIG. 1 and FIG. 2, a frequency modulation type wireless power supply and charger system in accordance with the present invention is shown comprising a power supply base unit 1 and a wireless power supply and charge receiver unit 2.

The power supply base unit 1 comprises a first microprocessor 11, a power circuit 12, a power switch driver circuit 13, a first resonant circuit 14, a first coil 15 and a detection module 16. The power circuit 12 is electrically connected to the first microprocessor 11 and electrically connected to an external power source 3 and adapted for providing a low voltage power supply to the first microprocessor 11. The power switch driver circuit 13 is electrically connected to the first microprocessor 11 and the power circuit 12, and adapted for providing a high voltage power supply to the first microprocessor 11. Further, the power switch driver circuit 13 comprises a full/half-bridge driver circuit 131, a first MOSFET (metal oxide semiconductor field effect transistor) array 132 and a second MOSFET (metal oxide semiconductor field effect transistor) array 133 connected in parallel to the full/half-bridge driver circuit 131. The first resonant circuit 14 has two input ends thereof respectively electrically connected to the first MOSFET array 132 and the second MOSFET array 133. The first coil 15 is electrically connected to the output end of the first resonant circuit 14, and adapted to receive signal and to emit energy. The detection module 16 is electrically connected to the first microprocessor 11, the power circuit 12 and the first resonant circuit 14, comprising a signal detection circuit 161 and a voltage detection circuit 162 and adapted for detecting the low voltage power supply provided by the power circuit 12 and the output signal provided by the first resonant circuit 14 and outputting the respective detection results to the first microprocessor 11.

The wireless power supply and charge receiver unit 2 comprises a second coil 21 capable of emitting signal and receiving power supply by means of electromagnetic induction, a second resonant circuit 22 electrically connected to the second coil 21, a rectifier filter circuit 23 electrically connected to the second resonant circuit 22 and adapted for receiving a high-voltage AC power supply from the second resonant circuit 22, and a detection and protection module 24 electrically connected to the rectifier filter circuit 23. The detection and protection module 24 comprises a voltage regulator circuit 241 electrically connected to the rectifier filter circuit 23 and adapted to convert the high-voltage AC power supply into a predetermined low-voltage power supply, a voltage detection circuit 242 electrically connected to the rectifier filter circuit 23 and the voltage regulator circuit 241, a buck-boost converter 243 electrically connected to the voltage detection circuit 242, a current detection and protection circuit 244 electrically connected to the voltage regulator circuit 241 and the buck-boost converter 243 and adapted to output a power supply to an external electronic device 4, a circuit-breaker protection circuit 245 electrically connected between the voltage regulator circuit 241 and the rectifier filter circuit 23, and a temperature sensor 246 electrically connected to the voltage regulator circuit 241.

The wireless power supply and charge receiver unit 2 further comprises a second microprocessor 25 electrically connected to the voltage detection circuit 242, current detection and protection circuit 244 and temperature sensor 246 of the detection and protection module 24 for receiving and processing their output signals and also electrically connected to the circuit-breaker protection circuit 245 for receiving its output signal, a signal generator circuit 26 electrically connected between the second microprocessor 25 and the second resonant circuit 22 and controllable by the second microprocessor 25 to generate a signal and output the generated signal to the second resonant circuit 22, and a charging module 27 electrically connected to the voltage regulator circuit 241 of the detection and protection module 24. The charging module 27 comprises a charge management circuit 271 electrically connected to the voltage regulator circuit 241 and adapted for receiving the output low-voltage power supply from the voltage regulator circuit 241, and a storage battery 272 electrically connected to and chargeable by the charge management circuit 271. The storage battery 272 is also electrically connected to the buck-boost converter 243.

Figure 3:
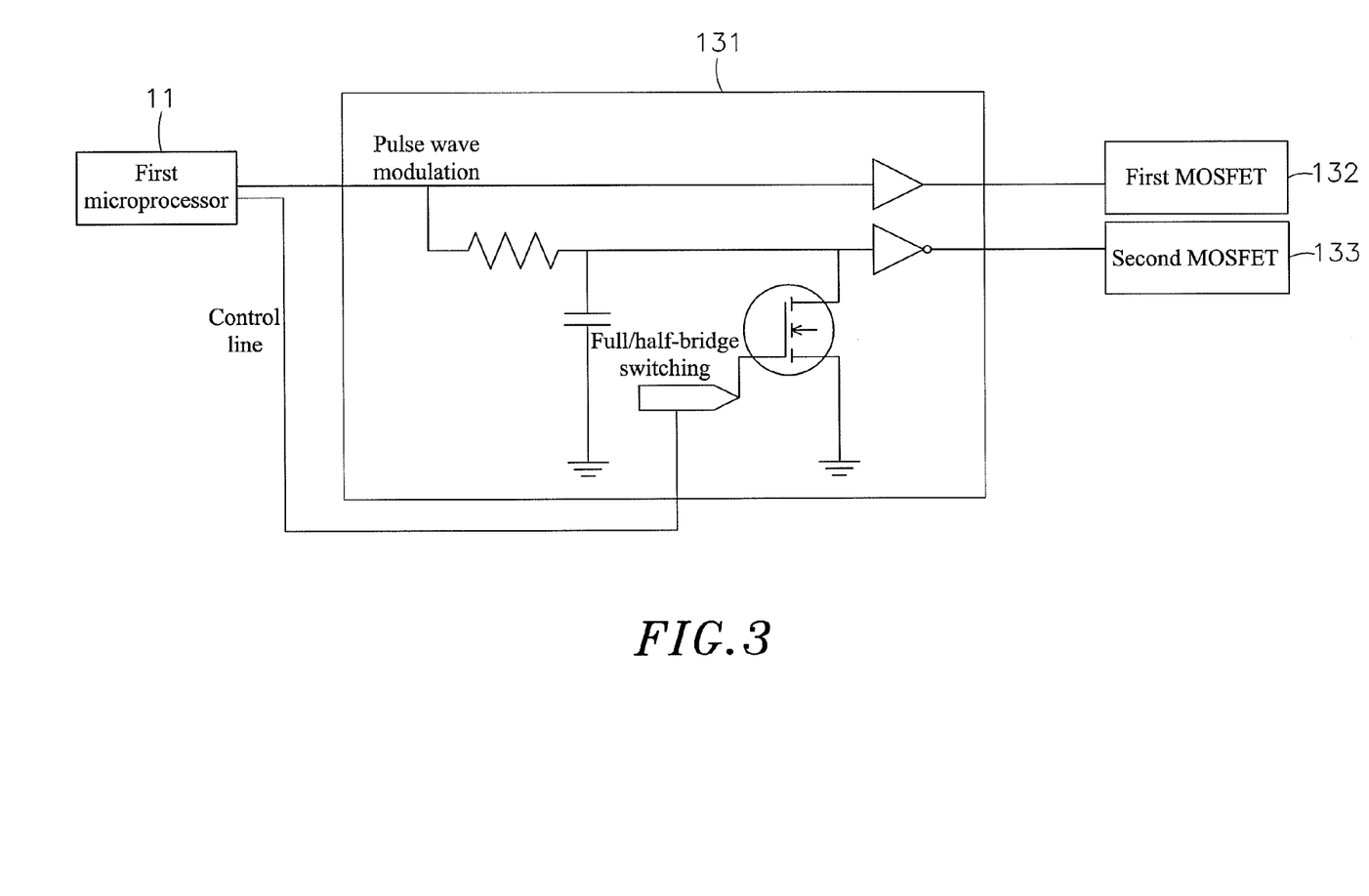
FIG. 3 is a circuit diagram of the full/half-bridge driver circuit of the power switch driver circuit of the power supply base unit according to the present invention.
Figure 4:
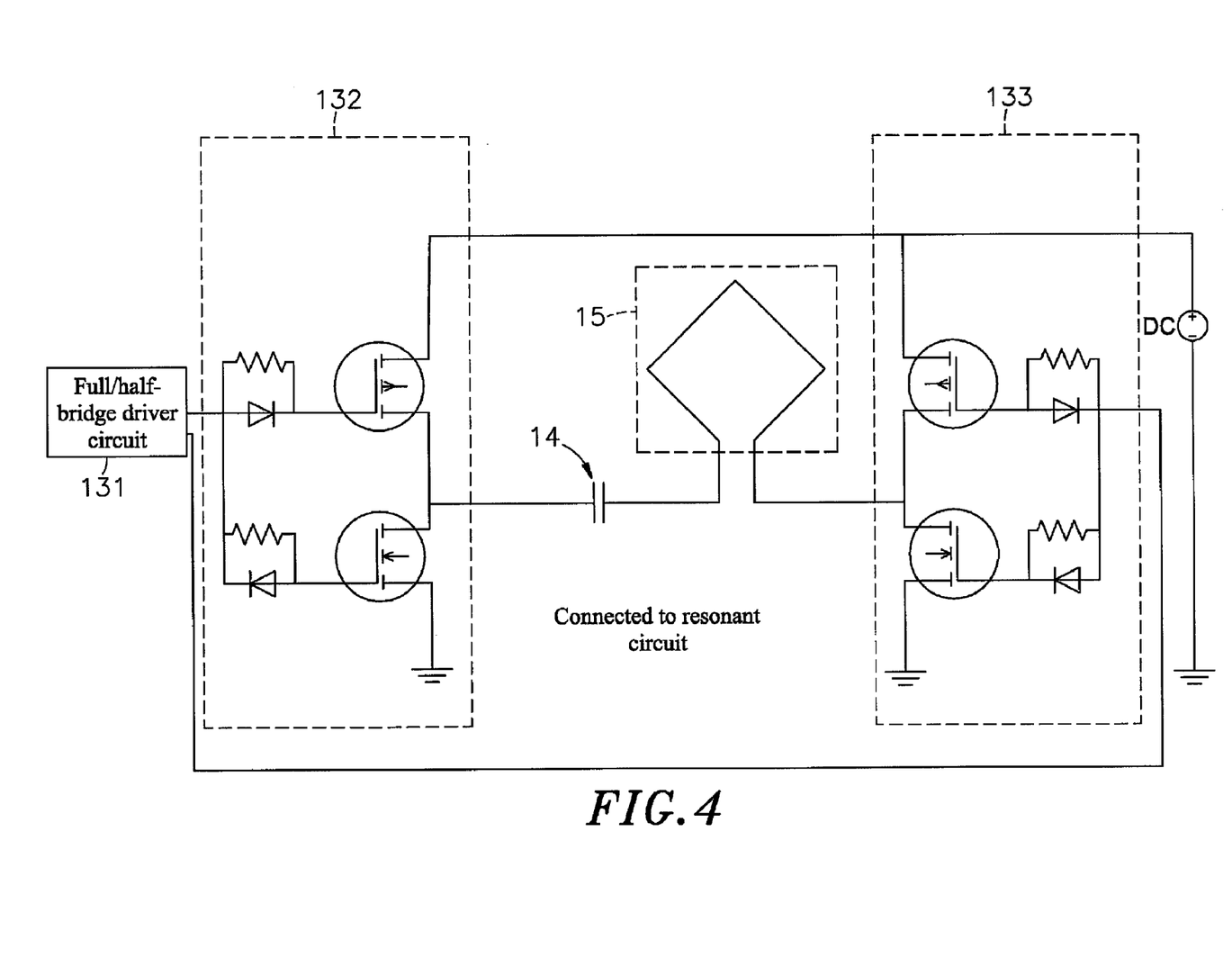
FIG. 4 is a circuit diagram of a part of the power supply base unit according to the present invention.

Referring to FIGS. 3 and 4 and FIG. 1 again, the first microprocessor 11 outputs a PWM (pulse-width modulation) signal and a control signal to the full/half-bridge driver circuit 131. The full/half-bridge driver circuit 131 comprises a RC delay circuit consisting of a resistor and a capacitor, and a forward driver IC and a backward driver IC connected in parallel to the RC delay circuit. The RC delay circuit provides an output signal to the backward driver IC. The PWM (pulse-width modulation) signal is outputted by the first microprocessor 11 into the RC delay circuit and the forward driver IC. The backward driver IC has an N-type MOSFET connected to the input gate thereof. The N-type MOSFET has a switch connected thereto for receiving the control signal outputted by the first microprocessor 11. Subject to the control of the first microprocessor 11, the input state is controlled to be signal or grounding. The aforesaid first MOSFET array 132 and the aforesaid second MOSFET array 133 are respectively connected to the output end of the backward driver IC and the output end of the forward driver IC.

The aforesaid first MOSFET array 132 and second MOSFET array 133 are respectively comprised of an N-type MOSFET and a P-type MOSFET. Both the N-type MOSFET and the P-type MOSFET have the respective front ends connected with a diode and a resistor for charging and discharging the switch to receive the driver signal from the full/half-bridge driver circuit 131 for switching the output to high-voltage power supply or grounding. After connection of the first coil 15 to the resonant capacitor of the first resonant circuit 14 in series, the two ends of the full/half-bridge driver circuit 131 are respectively connected to the first MOSFET array 132 and the second MOSFET array 133 for receiving a reversed driving signal to achieve full-bridge driving, or to have the first MOSFET array 132 be switched to ground for half-bridge driving.

Figure 5:
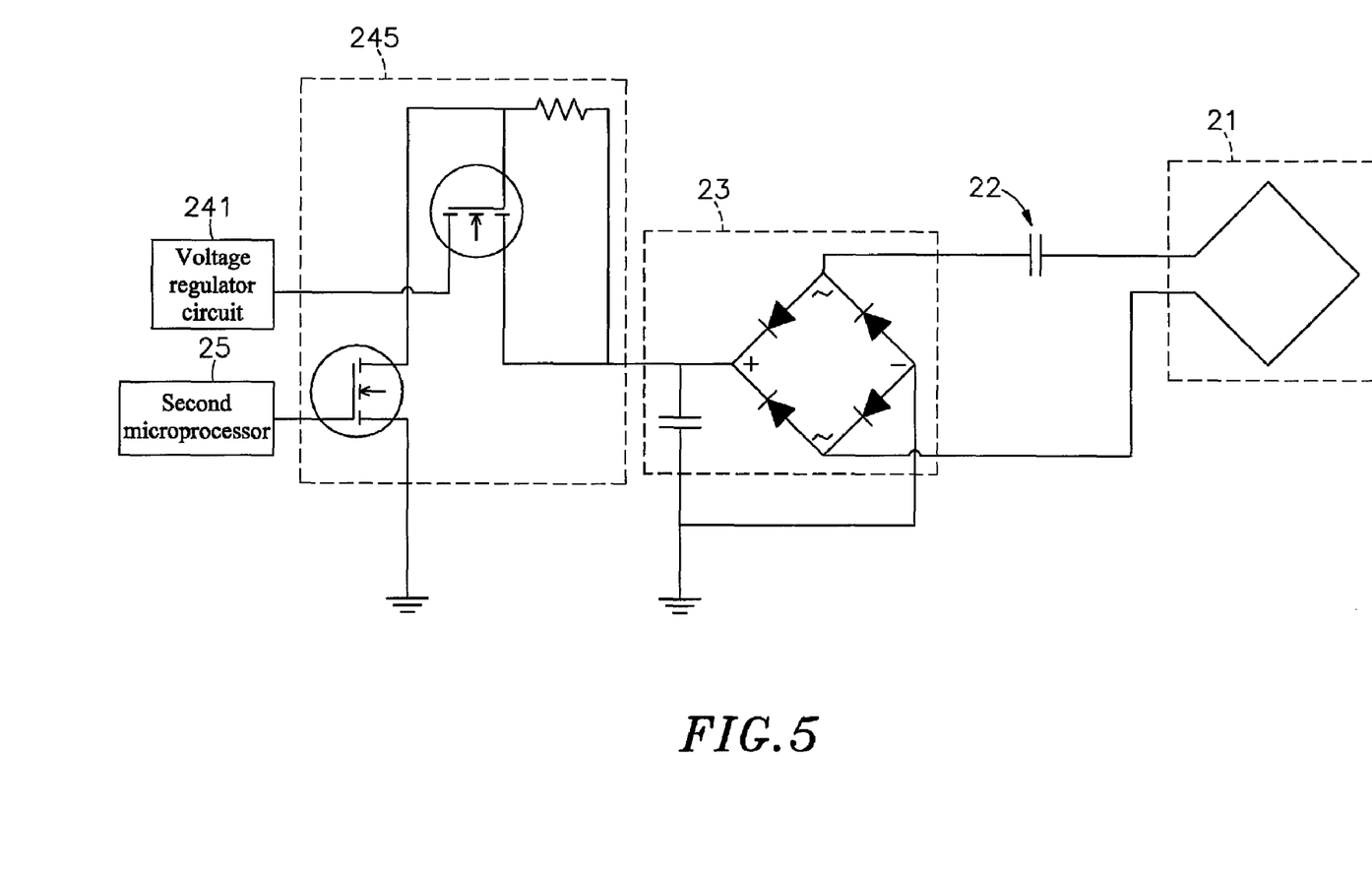
FIG. 5 is a circuit diagram of a part of the wireless power supply and charge receiver unit according to the present invention.

Referring to FIG. 5 and FIG. 2 again, the second coil 21 of the wireless power supply and charge receiver unit 2 is connected in series to a resonant capacitor of the second resonant circuit 22, and then the two distal ends of the second resonant circuit 22 are respectively connected to the two AC input ends of a bridge rectifier of the rectifier filter circuit 23, which consists of the bridge rectifier and a filter capacitor. The rectifier filter circuit 23 is connected to the circuit-breaker protection circuit 245 of the detection and protection module 24. The circuit-breaker protection circuit 245 consists of an N-type MOSFET and a P-type MOSFET. The P-type MOSFET of the circuit-breaker protection circuit 245 is connected to the voltage regulator circuit 241. The N-type MOSFET of the circuit-breaker protection circuit 245 is connected to the second microprocessor 25 for controlling on/off of the matched P-type MOSFET.

Referring to FIGS. 1 and 2 again, during the use of the power supply base unit 1 and wireless power supply and charge receiver unit 2 of the frequency modulation type wireless power supply and charger system, the power supply base unit 1 is connected to an external power source 3. At this time, the output electrical power from the external power source 3 is converted by the power switch driver circuit 13 and the processed through the first resonant circuit 14 and then converted by the first coil 15 into an electromagnetic wave signal for emission. The emitted electromagnetic wave signal is then received by the second coil 21 of the wireless power supply and charge receiver unit 2, and then processed through the second resonant circuit 22 into high-voltage AC power for output to the rectifier filter circuit 23. This high-voltage AC power is then converted by the voltage regulator circuit 241 of the detection and protection module 24 into a low-voltage power for charging an external electronic device 4 that is connected to the current detection and protection circuit 244 of the detection and protection module 24 of the wireless power supply and charge receiver unit 2.

When charging the external electronic device 4, the temperature sensor 246 of the detection and protection module 24 detects the temperature of the low voltage power outputted by the voltage regulator circuit 241, and provides the detection data to the second microprocessor 25 for analysis. If the detected temperature surpasses a predetermined value, the second microprocessor 25 immediately outputs an encoded signal to the signal generator circuit 26 for causing the signal generator circuit 26 to mix the encoded signal into the second resonant circuit 22 so that the second coil 21 will output a signal to the power supply base unit 1, requesting the power supply base unit 1 to reduce its output power or to stop outputting the power signal. At this time, the signal detection circuit 161 of the power supply base unit 1 detects the continuous signal received by the first coil 15 from the signal generator circuit 26 and transmits the detected signal to the first microprocessor, and the voltage detection circuit 162 converts the AC power contained in the signal received by the first coil 15 into a DC power and transmits the DC power to the first microprocessor 11 (the voltage detection circuit 162 detects the voltage of the rectifier filter circuit 23, the voltage regulator circuit 241, the buck-boost converter 243 and the storage battery 272). The first microprocessor 11 analyzes the signal of the signal detection circuit 161 and the voltage detection circuit 162, and then calculates the best frequency and driving type, and then output a control signal to the full/half-bridge driver circuit 131 subject to the calculation result, causing the full/half-bridge driver circuit 131 to adjust its output power. Therefore, the invention minimizes power transmission loss and the load of the internal components of the wireless power supply and charge receiver unit 2.

Referring to FIGS. 1 and 2 again, as stated above, the charging module 27 of the wireless power supply and charge receiver unit 2 comprises a charge management circuit 271 electrically connected to the voltage regulator circuit 241 and adapted for receiving the output low-voltage power supply from the voltage regulator circuit 241, and a storage battery 272 electrically connected to and chargeable by the charge management circuit 271 and also electrically connected to the buck-boost converter 243. When the voltage regulator circuit 241 of the detection and protection module 24 is providing electrical power to the charge management circuit 271 of the charging module 27, the charge management circuit 271 controls the charging status of the storage battery 272 (when the power of the storage battery 272 is high or nearly saturated, the charge management circuit 271 stops from charging the storage battery 272; when the power of the storage battery 272 is low, the charge management circuit 271 starts to charge the storage battery 272. Further, the storage battery 272 can be a nickel-metal hydride battery or lithium ion battery. The voltage of the battery power of the storage battery 272 can be boosted or bucked by the buck-boost converter 243 of the detection and protection module 24 to the voltage value required for charging the connected external electronic device 4. Thus, when the wireless power supply and charge receiver unit 2 is not kept close to the power supply base unit 1 or receives no electromagnetic wave signal from the power supply base unit 1, the wireless power supply and charge receiver unit 2 can use the battery power of the storage battery 272 to charge the connected external electronic device 4.

Referring to FIG. 2 again, as stated above, the circuit-breaker protection circuit 245 of the detection and protection module 24 is electrically connected between the voltage regulator circuit 241 and the rectifier filter circuit 23. The circuit-breaker protection circuit 245 is controllable by the second microprocessor 25 to open the circuit when the electric current is excessively high, thereby protecting the internal circuit. Further, the current detection and protection circuit 244 is electrically connected to the voltage regulator circuit 241 and the buck-boost converter 243. The current detection and protection circuit 244 uses a reset fuse for overcurrent protection. In case of an overcurrent, the current detection and protection circuit 244 provides a signal to the second microprocessor 25, enabling the second microprocessor 25 to cut off electrical power from the circuit-breaker protection circuit 245. Alternatively, the reset fuse of the current detection and protection circuit 244 can open the circuit for protection. Thus, the invention achieves a double safety protection design. Further, the current detection and protection circuit 244 integrates the electric power of the voltage regulator circuit 241 and the buck-boost converter 243, and automatically select the available voltage source for the connected external electronic device 4.

Referring to FIGS. 1 and 2 again, the power supply base unit 1 further comprises a power input interface 17 electrically connected to the power circuit 12 for connection to an external power source 3 for power input. The power input interface 17 can be a USB (universal serial bus) connector or DC power converter. The wireless power supply and charge receiver unit 2 further comprises a power output interface 28 electrically connected to the current detection and protection circuit 244 of the detection and protection module 24 for power output. The power output interface 28 can be a USB (universal serial bus) connector or DC power plug or socket for connection to an external electronic device 4.

Figure 6:
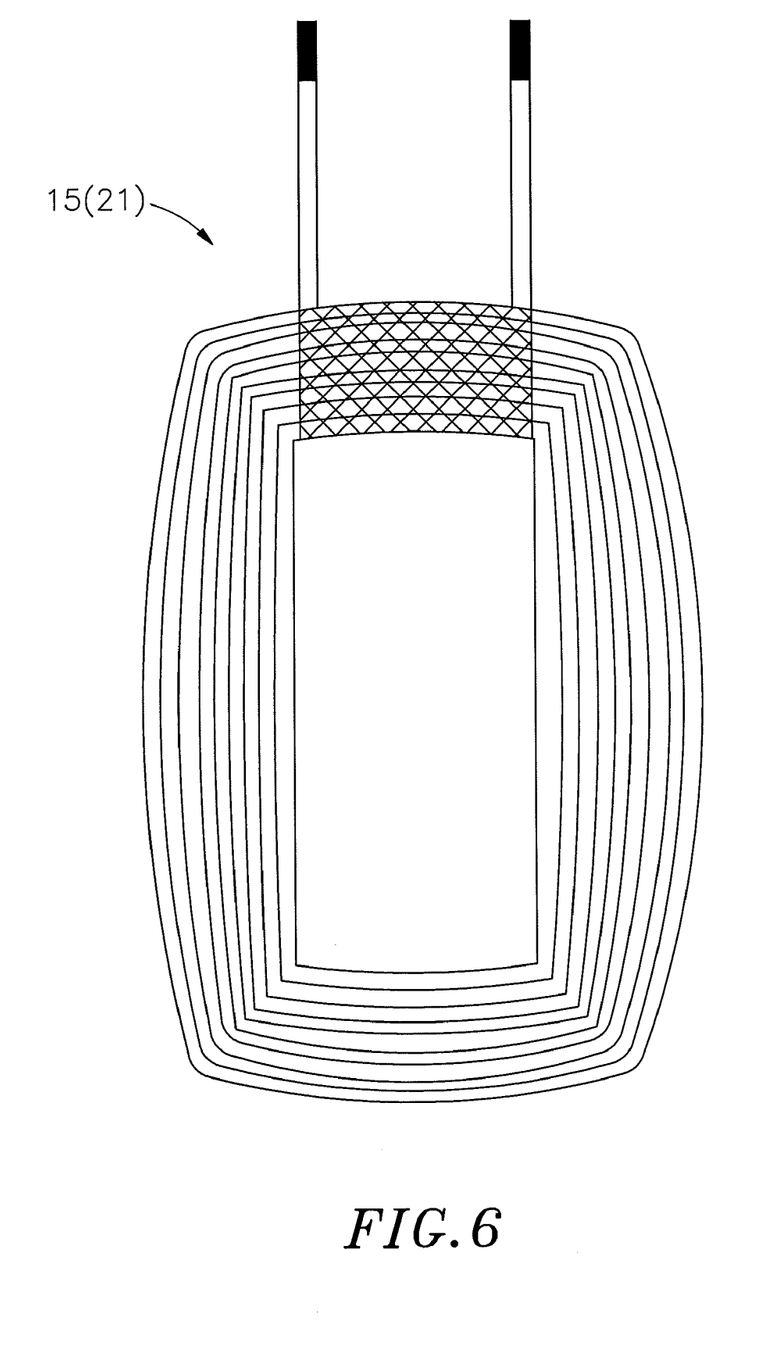
FIG. 6 is a schematic top view of a coil for the frequency modulation type wireless power supply and charger system in accordance with the present invention.

Referring to FIG. 6 and FIGS. 1 and 2 again, the first coil 15 and the second coil 21 are respectively made by: twisting multiple enameled wires together and bonding the twisted enameled wires with an insulative adhesive to form a wire material and then using a mold to wind the wire material into a flat, rectangular configuration with two lead ends of the coiled wire material extended out of one side and bonded with a lead-free solder material for electric conduction. Thus, the first coil 15 and the second coil 21 have low impedance and high inductance characteristics when used for high frequency application, reducing the amount of heat and improving the transmission efficiency and performance.

In conclusion, the invention provides a frequency modulation type wireless power supply and charger system, which has the following advantages and features:

1. The wireless power supply and charge receiver unit 2 uses the detection and protection module 24 to detect the supply of electrical power of the power supply base unit 1, such as the quality of resonant components, the relative position of the receiving coil at the secondary side, the condition of the receiving load at the secondary side, and the second microprocessor 25, the signal generator circuit 26, the second resonant circuit 22 and the second coil 21 to transmit signal to the power supply base unit 1 for enabling the power supply base unit 1 to automatically regulate its power output, thereby reducing power transmission loss, widening the effective range of the receiver coil and minimizing the load of the internal components of the wireless power supply and charge receiver unit 2.

2. The power switch driver circuit 13 of the power supply base unit 1 comprises a full/half-bridge driver circuit 131, a first MOSFET (metal oxide semiconductor field effect transistor) array 132 and a second MOSFET (metal oxide semiconductor field effect transistor) array 133, wherein the first MOSFET (metal oxide semiconductor field effect transistor) array 132 and the second MOSFET (metal oxide semiconductor field effect transistor) array 133 are connected in parallel to the full/half-bridge driver circuit 131. Thus, the full/half-bridge driver circuit 131 can switch the output power rapidly under a continuous operation status. When does no work, the full/half-bridge driver circuit 131 can cut off the first MOSFET (metal oxide semiconductor field effect transistor) array 132 and the second MOSFET (metal oxide semiconductor field effect transistor) array 133, avoiding power leakage and minimizing static power consumption.

3. The first coil 15 and the second coil 21 are respectively made by: twisting multiple enameled wires together and bonding the twisted enameled wires with an insulative adhesive to form a wire material and then using a mold to wind the wire material into a flat, rectangular configuration, rectangular configuration. Thus, the first coil 15 and the second coil 21 have low impedance and high inductance characteristics when used for high frequency application, reducing the amount of heat and improving the transmission efficiency and performance.

4. The resonant capacitor of the second resonant circuit 22 of the wireless power supply and charge receiver unit 2 is connected in series to the second coil 21, assuring zero power consumption during zero load resonance and high power obtaining during a high load.

5. The circuit-breaker protection circuit 245 of the detection and protection module 24 of the wireless power supply and charge receiver unit 2 is electrically connected between the voltage regulator circuit 241 and the rectifier filter circuit 23; the current detection and protection circuit 244 of the detection and protection module 24 is electrically connected to the voltage regulator circuit 241 and the buck-boost converter 243; the current detection and protection circuit 244 uses a reset fuse for overcurrent protection. In case of an overcurrent, electrical power is automatically cut off from the circuit-breaker protection circuit 245, the reset fuse of the current detection and protection circuit 244 opens the circuit for protection, and therefore the invention achieves a double safety protection, avoiding a short circuit or any possible damage.

As stated above, when the power supply base unit 1 transmits electrical power to the wireless power supply and charge receiver unit 2, the detection and protection module 24 of the wireless power supply and charge receiver unit 2 detects the supply of the electrical power, and the second microprocessor 25 sends a feedback signal to the power supply base unit 1 through the signal generator circuit 26 and the second resonant circuit 22 for analysis by the first microprocessor 11 of the power supply base unit 1 so that the power supply base unit 1 can control the power switch driver circuit 13 to regulate its output power automatically, thereby minimizing power transmission loss and the load of the internal components of the wireless power supply and charge receiver unit 2.

A prototype of frequency modulation type wireless power supply and charger system has been constructed with the features of FIGS. 1~6. The frequency modulation type wireless power supply and charger system functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A frequency modulation type wireless power supply and charger system, comprising a power supply base unit connected to an external power source, and a wireless power supply and charge receiver unit for receiving electrical power from said power supply base unit wirelessly for charging an external electronic device being connected thereto, wherein:

said power supply base unit comprises a first microprocessor, a power circuit electrically connected to said first microprocessor, a power input interface electrically connected to said power circuit for connection to the external electronic device to be charged, a power switch driver circuit electrically connected to said first microprocessor and said power circuit for providing a high voltage power supply to said first microprocessor, said power switch driver circuit comprising a full-bridge or half-bridge driver circuit, a first MOSFET (metal oxide semiconductor field effect transistor) array and a second MOSFET (metal oxide semiconductor field effect transistor) array connected in parallel to said full-bridge or half-bridge driver circuit, a first resonant circuit electrically connected to said second MOSFET array, a first coil electrically connected to said first resonant circuit to receive signal and to emit energy, a detection module electrically connected to said first microprocessor, said detection module comprising a signal detection circuit and a voltage detection circuit for detecting a low voltage power supply provided by said power circuit and an output signal provided by said first resonant circuit and outputting the respective detection results to said first microprocessor;

said wireless power supply and charge receiver unit comprises a second coil for emitting signal and receiving power supply by means of electromagnetic induction, a second resonant circuit electrically connected to said second coil, a rectifier filter circuit electrically connected to said second resonant circuit for receiving a high-voltage AC power supply from said second resonant circuit, and a detection and protection module electrically connected to said rectifier filter circuit, said detection and protection module comprising a voltage regulator circuit electrically connected to said rectifier filter circuit to convert the high-voltage AC power supply into a predetermined low-voltage power supply, a voltage detection circuit electrically connected to said rectifier filter circuit and said voltage regulator circuit, a circuit-breaker protection circuit electrically connected between said voltage regulator circuit and said rectifier filter circuit and controllable by a second microprocessor to open the circuit upon an overcurrent, a temperature sensor electrically connected to said voltage regulator circuit and a power output interface electrically connected to said voltage regulator circuit for power supply output to the external electronic device to be charged, said second microprocessor electrically connected to said voltage detection circuit and said temperature sensor for receiving detected signals therefrom, and a signal generator electrically connected to said second microprocessor and controllable by said second microprocessor to provide an encoded signal to said second resonant circuit.

2. The frequency modulation type wireless power supply and charger system as claimed in claim 1, wherein said first microprocessor of said power supply base unit outputs a PWM (pulse-width modulation) signal and a control signal to said full-bridge or half-bridge driver circuit; said full-bridge or half-bridge driver circuit comprises a RC delay circuit consisting of a resistor and a capacitor, and a forward driver IC and a backward driver IC connected in parallel to said RC delay circuit, said RC delay circuit provides an output signal to said backward driver IC, said PWM (pulse-width modulation) signal being outputted by said first microprocessor into said RC delay circuit and said forward driver IC, said backward driver IC having an N-type MOSFET connected to an input gate thereof, the N-type MOSFET at said backward driver IC having a switch connected thereto for receiving the control signal outputted by said first microprocessor for switching between signal and grounding, said first MOSFET array and said second MOSFET array being respectively connected to an output end of said backward driver IC and an output end of said forward driver IC.

3. The frequency modulation type wireless power supply and charger system as claimed in claim 1, wherein said first MOSFET array and second MOSFET array of said power switch driver circuit are respectively comprised of an N-type MOSFET and a P-type MOSFET, both the N-type MOSFET and the P-type MOSFET having respective front ends thereof connected with a diode and a resistor for receiving a driver signal from said full-bridge or half-bridge driver circuit for switching between output of high-voltage power supply and grounding, said full-bridge or half-bridge driver circuit having two ends thereof respectively connected to said first MOSFET array and said second MOSFET array for receiving a reversed driving signal to achieve full-bridge driving or to have the first MOSFET array be switched to ground for half-bridge driving after connection of said first coil to the resonant capacitor of said first resonant circuit in series.

4. The frequency modulation type wireless power supply and charger system as claimed in claim 1, wherein said first coil and said second coil are respectively formed of a wire material wound into a flat, rectangular configuration, and a lead-free solder material bonded to two distal ends of said wire material that are arranged at one side of said flat, rectangular configuration, said wire material being formed of multiple enameled wires being twisted together and an insulative adhesive bonded to the twisted multiple wires.

5. The frequency modulation type wireless power supply and charger system as claimed in claim 1, wherein said detection and protection module further comprises a current detection and protection circuit electrically connected between said voltage regulator circuit and said power output interface and electrically connected to said second microprocessor and controllable by said second microprocessor to cut off power supply from said power output interface upon an overcurrent, said current detection and protection circuit comprising a reset fuse for resetting the circuit upon an overcurrent.

6. The frequency modulation type wireless power supply and charger system as claimed in claim 1, wherein said detection and protection module of said wireless power supply and charge receiver unit further comprises a buck-boost converter electrically connected to said voltage detection circuit, the current detection and protection circuit electrically connected to said voltage regulator circuit and said buck-boost converter to output a power supply to the external electronic device to be charged via said power output interface; said wireless power supply and charge receiver unit further comprises a charging module electrically connected to said voltage regulator circuit of said detection and protection module, said charging module comprising a charge management circuit electrically connected to said voltage regulator circuit for receiving a low-voltage power supply outputted by said voltage regulator circuit and a storage battery electrically connected to and chargeable by said charge management circuit, said storage battery being also electrically connected to said voltage detection circuit.

7. The frequency modulation type wireless power supply and charger system as claimed in claim 1, wherein said second resonant circuit comprises a resonant capacitor connected in series to said second coil of said wireless power supply and charge receiver unit; said rectifier filter circuit comprises a bridge rectifier and a filter capacitor, said bridge rectifier having two AC input ends thereof respectively connected to the two distal ends of the series circuit of said second resonant circuit and said second coil, said rectifier filter circuit being connected to said circuit-breaker protection circuit of said detection and protection module, said circuit-breaker protection circuit comprising a N-type MOSFET and a P-type MOSFET, the P-type MOSFET of said circuit-breaker protection circuit being connected to said voltage regulator circuit, the N-type MOSFET of said circuit-breaker protection circuit being connected to said second microprocessor for controlling on/off of the matched P-type MOSFET.

8. The frequency modulation type wireless power supply and charger system as claimed in claim 1, wherein said power output interface is selected from a group of USB (universal serial bus) connector, DC power plug and DC power socket connectable to the external electronic device to be charged.

* * * * *